United States Patent
Kumabe

(10) Patent No.: US 12,158,534 B2
(45) Date of Patent: Dec. 3, 2024

(54) VEHICLE COMMUNICATION DEVICE AND VEHICLE COMMUNICATION METHOD

(71) Applicant: DENSO CORPORATION, Kariya (JP)

(72) Inventor: Seigou Kumabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 282 days.

(21) Appl. No.: 17/714,320

(22) Filed: Apr. 6, 2022

(65) Prior Publication Data
US 2022/0229147 A1 Jul. 21, 2022

Related U.S. Application Data

(63) Continuation of application No. PCT/JP2020/031836, filed on Aug. 24, 2020.

(30) Foreign Application Priority Data

Oct. 11, 2019 (JP) .................. 2019-188082

(51) Int. Cl.
| | |
|---|---|
| G01S 5/00 | (2006.01) |
| G01S 5/02 | (2010.01) |
| H04W 4/02 | (2018.01) |
| H04W 4/029 | (2018.01) |
| H04W 4/26 | (2009.01) |
| H04W 4/40 | (2018.01) |
| H04W 12/03 | (2021.01) |

(52) U.S. Cl.
CPC .......... *G01S 5/0072* (2013.01); *G01S 5/0247* (2013.01); *H04W 4/029* (2018.02); *H04W 4/26* (2013.01); *H04W 4/40* (2018.02); *H04W 12/03* (2021.01)

(58) Field of Classification Search
None
See application file for complete search history.

(56) References Cited

U.S. PATENT DOCUMENTS

| | | | |
|---|---|---|---|
| 2017/0092133 A1 | 3/2017 | Kato | |
| 2020/0189522 A1* | 6/2020 | An | ............ H04W 4/40 |
| 2020/0269811 A1* | 8/2020 | Kim | ......... B60R 25/245 |

FOREIGN PATENT DOCUMENTS

| | | |
|---|---|---|
| JP | 2007017192 A | 1/2007 |
| JP | 2009290669 A | 12/2009 |
| JP | 2012120093 A | 6/2012 |

(Continued)

*Primary Examiner* — Adolf Dsouza
(74) *Attorney, Agent, or Firm* — Harness, Dickey & Pierce, P.L.C.

(57) ABSTRACT

A vehicle communication device includes: a position specification unit that configured to specifies coordinates of latitude and longitude of a subject vehicle as position information; a receiving unit that receives the communication frame transmitted from a surrounding terminal device, the communication frame including, in a region other than the data main part, low decimal place latitude/longitude coordinates that are low decimal place part of coordinates of latitude and longitude of the surrounding terminal device and that are not encrypted; and a surrounding terminal device position estimating unit that estimates coordinates of latitude and longitude of the position of the surrounding terminal device based on the coordinates of latitude and longitude of the subject vehicle and the low decimal place latitude/longitude coordinates of the surrounding terminal device.

10 Claims, 8 Drawing Sheets

(56) References Cited

FOREIGN PATENT DOCUMENTS

| JP | 2015225468 A | | 12/2015 |
|---|---|---|---|
| JP | 2017068711 A | | 4/2017 |
| WO | WO-2017130558 A1 | * | 8/2017 |

* cited by examiner

FIG. 4

```
0:N
1:NNE
2:NE
3:ENE
4:E
5:ESE
6:SE
7:SSE
8:S
9:SSW
10:SW
11:WSW
12:W
13:WNW
14:NW
15:NNW
```

FIG. 5

```
0: PEDESTRIAN
1: BICYCLE
2: NORMAL VEHICLE
3: CONSTRUCTION VEHICLE
4: EMERGENCY VEHICLE
```

FIG. 8

|  | EMERGENCY VEHICLE | CONSTRUCTION VEHICLE | NORMAL VEHICLE | BICYCLE | PEDESTRIAN |
|---|---|---|---|---|---|
| OPPOSITE DIRECTION | 400[m] | 200[m] | 200[m] | 150[m] | 100[m] |
| SEPARATING DIRECTION | 0[m] | 0[m] | 0[m] | 0[m] | 0[m] |
| INTERSECTING DIRECTION | 200[m] | 100[m] | 100[m] | 75[m] | 50[m] |
| SAME DIRECTION | 150m] | 75[m] | 75[m] | 75[m] | 50[m] |

FIG. 10

| | THRESHOLD |
|---|---|
| OPPOSITE DIRECTION | 200 [m] |
| SEPARATING DIRECTION | 0 [m] |
| INTERSECTING DIRECTION | 100 [m] |
| SAME DIRECTION | 75 [m] |

FIG. 11

| | EMERGENCY VEHICLE | CONSTRUCTION VEHICLE | NORMAL VEHICLE | BICYCLE | PEDESTRIAN |
|---|---|---|---|---|---|
| THRESHOLD | 200m | 100 [m] | 100 [m] | 75 [m] | 50 [m] | ations
VEHICLE COMMUNICATION DEVICE AND VEHICLE COMMUNICATION METHOD

CROSS REFERENCE TO RELATED APPLICATION

This application is a continuation application of International Patent Application No. PCT/JP2020/031836 filed on Aug. 24, 2020, which designated the U.S. and claims the benefit of priority from Japanese Patent Application No. 2019-188082 filed on Oct. 11, 2019. The entire disclosure of all of the above application is incorporated herein by reference.

TECHNICAL FIELD

The present disclosure relates to a vehicle communication device and a vehicle communication method.

BACKGROUND ART

There has been known vehicle communication devices used in vehicles and configured to transmit and receive information via wireless communication. For example, each vehicle periodically transmits information such as a current position, a traveling speed, and a traveling direction to surrounding vehicles by performing vehicle-to-vehicle communication by a CSMA method.

Information of a vehicle position (hereinafter, referred to as "vehicle position information") transmitted via vehicle-to-vehicle communication is regarded as personal information that needs to be encrypted. Therefore, after the vehicle position information is stored in a data main part of a communication frame, this data main part is encrypted and transmitted. Thus, for a receiving side that receives such a communication frame, it is necessary to decrypt the data main part of the communication frame and extract the vehicle position information from the decrypted data main part to calculate the vehicle position of the vehicle that is a transmitting source for the communication frame.

SUMMARY

A vehicle communication device according to a first aspect of the present disclosure is used for a subject vehicle. The vehicle communication device is configured to wirelessly receive a communication frame having a data main part that is encrypted. The device includes: a position specification unit that is configured to specify at least coordinates of latitude and longitude of a position of a subject vehicle as position information; a receiving unit that is configured to receive the communication frame transmitted from a surrounding terminal device around the subject vehicle, the communication frame including, in a region other than the data main part, low decimal place latitude/longitude coordinates that are low decimal place part of coordinates of latitude and longitude of a position of the surrounding terminal device and that are not encrypted; and a surrounding terminal device position estimating unit that is configured to estimate coordinates of latitude and longitude of the position of the surrounding terminal device based on the coordinates of latitude and longitude of the subject vehicle specified by the position specification unit and the low decimal place latitude/longitude coordinates of the surrounding terminal device included in the communication frame received by the receiving unit.

BRIEF DESCRIPTION OF DRAWINGS

FIG. 4 is a diagram showing 16 divided directions associated with values of 0 to 15.

FIG. 5 is a diagram showing types of moving bodies associated with values of 0 to 4.

FIG. 8 shows an example of setting threshold values according to the directional combination pattern and the types of the surrounding terminal devices.

FIG. 10 shows an example of the setting threshold values according to the directional combination pattern according to a third embodiment.

FIG. 11 shows an example of the setting threshold values according to the types of the surrounding terminal devices according to a fourth embodiment.

DESCRIPTION OF EMBODIMENTS

Figure 1:
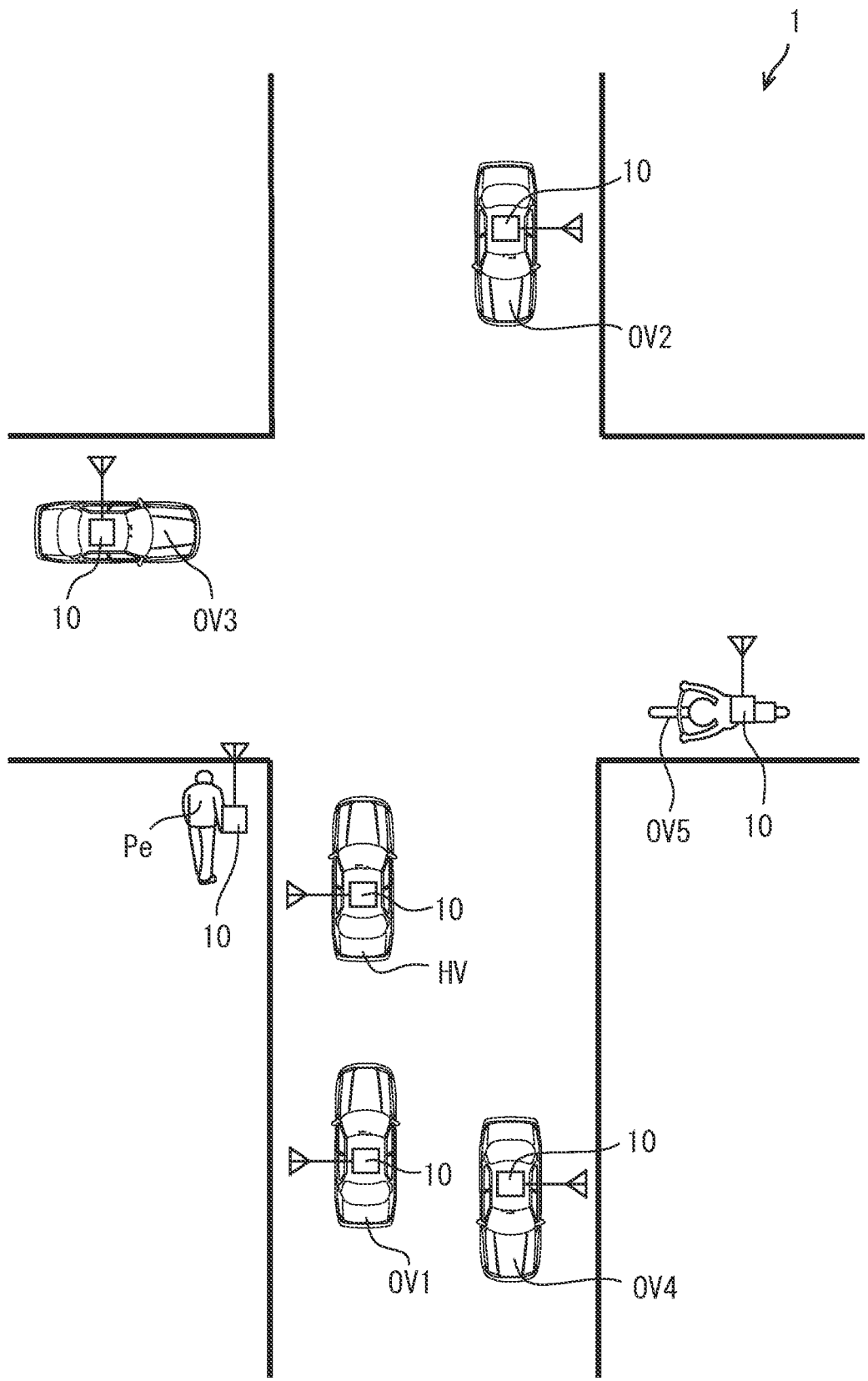
FIG. 1 is a diagram showing an example of a schematic configuration of a communication system.

To begin with, a relevant technology will be described first only for understanding the following embodiments.

When the information transmitted from the surrounding vehicles via the vehicle-to-vehicle communication is used for a service such as driving support of the subject vehicle, the transmitted information of the surrounding vehicles may include, depending on the positional relationship between the subject vehicle and the surrounding vehicles, information unnecessary to perform the service. However, to judge whether the information of surrounding vehicles is unnecessary for the service from the positional relationship between the subject vehicle and the surrounding vehicles, it would have to decrypt the data main part of the communication frame received from the surrounding vehicles to retrieve the vehicle position information for all the information received from the surrounding vehicles. Therefore, there would be a problem that processing load on the vehicle communication device increases because the data main part of the communication frame needs to be decrypted although it is unnecessary to perform a service.

One objective of the present disclosure is to provide a vehicle communication device and a vehicle communication method that make it possible to reduce processing load when the service of the subject vehicle is performed using information transmitted from surrounding terminal devices around the subject vehicle via wireless communication.

As described above, a vehicle communication device according to the first aspect of the present disclosure is used for a subject vehicle. The vehicle communication device is configured to wirelessly receive a communication frame having a data main part that is encrypted. The device includes: a position specification unit that is configured to specify at least coordinates of latitude and longitude of a position of a subject vehicle as position information; a receiving unit that is configured to receive the communication frame transmitted from a surrounding terminal device around the subject vehicle, the communication frame including, in a region other than the data main part, low decimal place latitude/longitude coordinates that are low decimal place part of coordinates of latitude and longitude of a position of the surrounding terminal device and that are not encrypted; and a surrounding terminal device position estimating unit that is configured to estimate coordinates of latitude and longitude of the position of the surrounding terminal device based on the coordinates of latitude and longitude of the subject vehicle specified by the position specification unit and the low decimal place latitude/longitude coordinates of the surrounding terminal device included in the communication frame received by the receiving unit.

A vehicle communication method according to a second aspect of the present disclosure is used for a subject vehicle configured to wirelessly receive a communication frame having a data main part that is encrypted. The method includes: specifying coordinates of latitude and longitude of a position of the subject vehicle as position information; receiving the communication frame transmitted from a surrounding terminal device around the subject vehicle, the communication frame including, in a region other than the data main part, low decimal place latitude/longitude coordinates that are low decimal place part of coordinates of latitude and longitude of a position of the surrounding terminal device and that are not encrypted; and estimating coordinates of latitude and longitude of the position of the surrounding terminal device based on the specified coordinates of latitude and longitude of the subject vehicle and the low decimal place latitude/longitude coordinates of the surrounding terminal device included in the received communication frame.

A vehicle communication device according to a third aspect of the present disclosure is for a subject vehicle configured to wirelessly receive a communication frame having a data main part that is encrypted. The device includes at least one processor programmed to: specify at least coordinates of latitude and longitude of a position of a subject vehicle as position information; receive the communication frame transmitted from a surrounding terminal device around the subject vehicle, the communication frame including, in a region other than the data main part, low decimal place latitude/longitude coordinates that are low decimal place part of coordinates of latitude and longitude of a position of the surrounding terminal device and that are not encrypted; and estimate coordinates of latitude and longitude of the position of the surrounding terminal device based on the specified coordinates of latitude and longitude of the subject vehicle and the low decimal place latitude/longitude coordinates of the surrounding terminal device included in the received communication frame.

According to the above-described aspects, the surrounding terminal device that is able to wirelessly receive the communication frame should be located within a wireless communication range with the subject vehicle. Thus, high digit parts of the coordinates of latitude and longitude of the subject vehicle should be the same as those of the surrounding terminal device. Accordingly, even though only low decimal place latitude/longitude coordinates that are a low decimal place part of coordinates of latitude and longitude of a position of the surrounding terminal device are received from the surrounding terminal device, the coordinates of latitude and longitude of the surrounding terminal device can be estimated based on the coordinates of latitude and longitude of the subject vehicle and the received low decimal place latitude/longitude coordinates. Further, since the low decimal place latitude/longitude coordinates are included in a region of the communication frame other than the data main part and are not encrypted, the coordinates of the surrounding terminal device can be estimated without decrypting the data main part. Therefore, it is possible to decrypt the data main part by selecting the surrounding terminal device that has the data main part to be decrypted based on the coordinates of the surrounding terminal device. Therefore, it is possible to avoid unnecessary decryption of the data main part that does not need to be decrypted. As a result, it is possible to reduce processing load when the service of the subject vehicle is performed using the information transmitted from the surrounding terminal device around the subject vehicle via wireless communication.

Next, a plurality of embodiments will be described.

First Embodiment

<Schematic Configuration of a Communication System 1>

Hereinafter, Embodiment 1 of the present disclosure will be described with reference to drawings. As shown in FIG. 1, the communication system 1 includes terminal devices 10 each used for a respective one of a plurality of moving bodies. In the example shown in FIG. 1, the terminal devices 10 are used at a subject vehicle HV, a following vehicle OV1 of the subject vehicle HV, an oncoming vehicle OV2 of the subject vehicle HV 2, a crossing vehicle OV3 traveling in a direction intersecting with the traveling direction of the subject vehicle HV 3, an opposite vehicle OV4 going away from the subject vehicle HV, a bicycle OV5, and a pedestrian Pe. It is assumed that the subject vehicle HV, the following vehicle OV1, the oncoming vehicle OV2, the crossing vehicle OV3, and the opposite vehicle OV4 are automobiles. The terminal devices 10 may be used for other mobile bodies, but will be described below according to the example of FIG. 1.

<Schematic Configuration of the Terminal Device 10>

Figure 2:
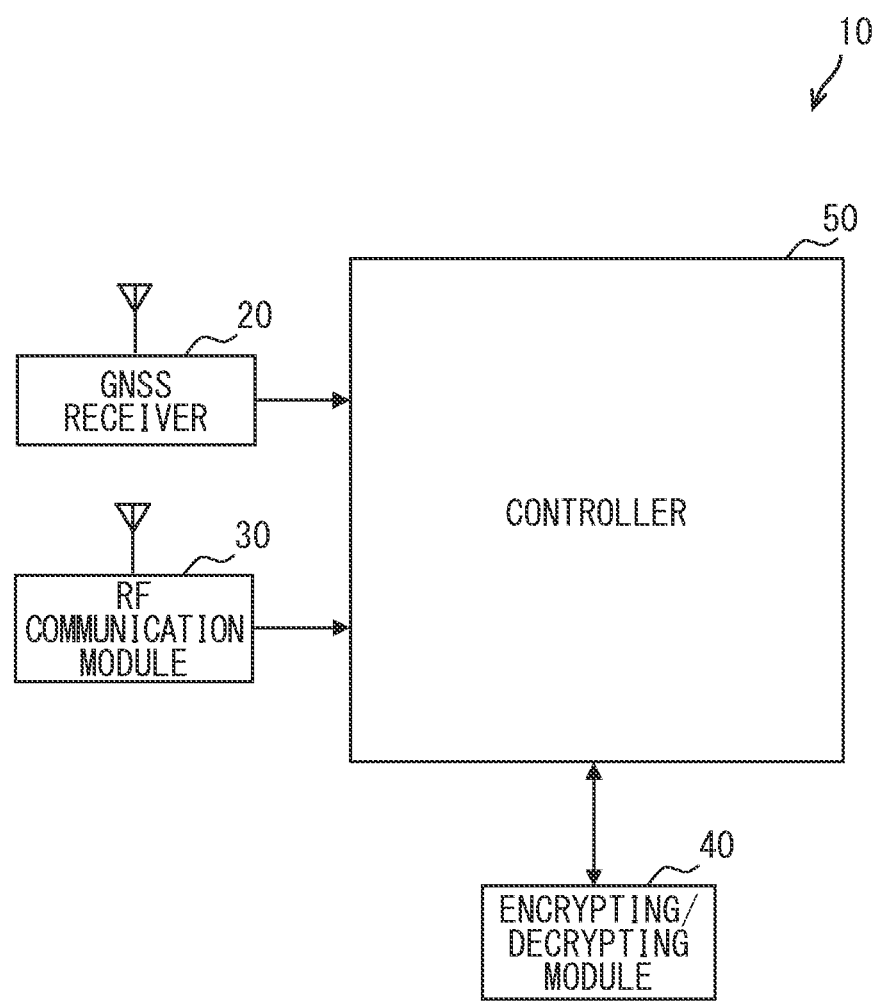
FIG. 2 is a diagram showing an example of a schematic configuration of a terminal device.

Next, an example of a schematic configuration of the terminal device 10 will be described with reference to FIG. 2. As shown in FIG. 2, the terminal device 10 includes a GNSS (Global Navigation Satellite System) receiver 20, an RF communication module 30, an encrypting/decrypting module 40, and a controller 50.

The GNSS receiver 20 receives positioning signals from multiple positioning satellites and outputs them to the controller 50. The positioning signal is used to calculate the current position of the subject terminal device. The positioning signal is also used to calculate a moving speed of the subject terminal device using the Doppler effect of the carrier wave.

The RF communication module 30 is a module for transmitting/receiving information via wireless communication with terminal devices 10 around the subject terminal device (hereinafter, referred to as surrounding terminal devices). Wireless communication between the terminal devices 10 used at vehicles is performed as vehicle-to-vehicle communication. Wireless communication between the terminal device 10 used at a vehicle and the terminal device 10 used by a pedestrian is performed as vehicle-to-pedestrian communication. The RF communication module 30 transmits/receives information via wireless communication with the RF communication modules 30 in the surrounding terminal devices within a communication range.

The RF communication module 30 may perform wireless communication by, for example, a broadcasting method. The RF communication module 30 performs wireless communication using a frequency band of the RF band. The RF band is a frequency band that can be used as a carrier wave for wireless communication. The RF communication module 30 may be configured to perform wireless communication using a frequency band such as a 700 MHz band or a 5.8 GHz band. The communication range of the RF communication module 30 is less than 1 km. The horizontal communication range of the RF communication module 30 is, for example, 200 m to 400 m. The communication range in the vertical direction of the RF communication module 30 is, for example, less than 200 m. The directivity of the RF communication module 30 on the horizontal plane is, for example, substantially omnidirectional.

The RF communication module 30 transmits/receives information by means of communication frames. The data structure of each communication frame includes a header part and a data main part. The data structure of the communication frame also includes an FCS (Frame Check Sequence) and the like. Although the details will be described later, the data main part of the communication frame is encrypted for transmission and reception, while the header part and the like other than the data main part are transmitted and received without being encrypted.

When the terminal device 10 is used by a vehicle, the data main part includes IDs for identifying the vehicle. When the terminal device 10 is used by a bicycle, a pedestrian, or the like, the data main part may include IDs for identifying the moving body using the terminal device 10. Further, the data main part may include information of a moving speed specified by the GNSS receiver 20. The data main part may be called as a payload. This data main part may be called as a data main part.

The header part includes a physical address as an address indicating a transmitting source. This header part corresponds to a portion other than the data main part, and this physical address corresponds to a physical address of the terminal device 10. The value of the physical address is variable. This is because the wireless communication performed by the RF communication module 30 is a broadcast type, and therefore it is not essential that the physical address of the transmitting source is fixed. As the physical address, a MAC address, for example, may be used. Hereinafter, an example where the MAC address is used will be described. Therefore, in the present embodiment, the physical address is a 12-digit identification number.

The encrypting/decrypting module 40 is a module for encrypting and decrypting data. The encrypting/decrypting module 40 is used for encrypting the data main part of the communication frame transmitted from the RF communication module 30. The encrypting/decrypting module 40 is also used for decrypting the data main part of the communication frame transmitted from the RF communication module 30. The encrypting/decrypting module 40 may be integrally formed with the RF communication module 30, for example.

The controller 50 includes a CPU, a memory, an I/O, and a bus connecting therebetween, and executes various processes by the CPU executing control programs stored in the memory. The memory referred to here is a non-transitory tangible storage medium for storing programs and data that can be read by a computer non-transitory way. The non-transitory tangible storage medium is embodied by a semiconductor memory or a magnetic disk. The controller 50 corresponds to a vehicle communication device. The details of the controller 50 will be described below.

<Schematic Configuration of the Controller 50>

Figure 3:
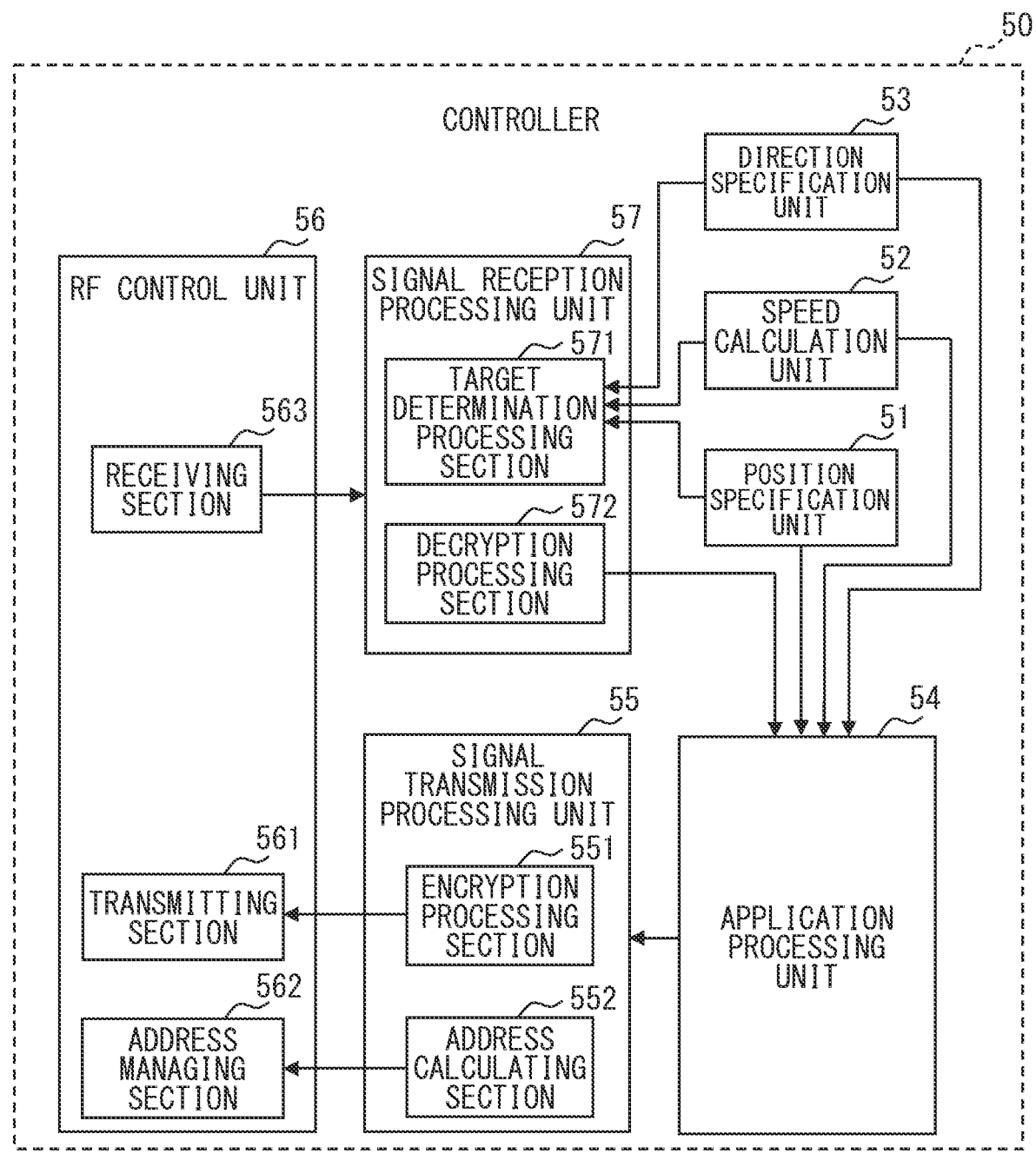
FIG. 3 is a diagram showing an example of a schematic configuration of a controller.

Next, an example of a schematic configuration of the controller 50 will be described with reference to FIG. 3. As shown in FIG. 3, the controller 50 includes a position specification unit 51, a speed calculation unit 52, a direction specification unit 53, an application processing unit 54, a signal transmission processing unit 55, an RF control unit 56, and a signal reception processing unit 57 as functional blocks. Some or all of the functions executed by the controller 50 may be formed as hardware with one or more ICs or the like. A part or all of the functional blocks included in the controller 50 may be realized by executing software by a processor and a combination of hardware members.

The position specification unit 51 sequentially calculates and specifies coordinates indicating the position of the subject terminal device (hereinafter, subject position coordinates) based on positioning signals sequentially received by the GNSS receiver 20. The coordinates may be coordinates indicating a latitude, a longitude, and an altitude. The coordinates may be expressed in, for example, the decimal system of the world geodetic system. For example, the coordinates of latitude and longitude indicating the position of the subject terminal device are represented by values up to the sixth decimal place so that the position can be represented in units of about 1 m. The coordinate of altitude is also represented by a value up to the sixth decimal place according to the coordinates of latitude and longitude. The unit of the coordinates of latitude and longitude is "deg", and the unit of the coordinate of altitude is "m". The position specification unit 51 corresponds to a vehicle position specification unit.

The speed calculation unit 52 sequentially calculates and specifies a moving speed of the subject terminal device based on the positioning signals sequentially received by the GNSS receiver 20 using the Doppler effect of the carrier wave from the positioning satellite. The speed calculation unit 52 may calculate the moving speed of the subject terminal device based on changes in the position of the subject terminal device sequentially specified by the position specification unit 51.

The direction specification unit 53 sequentially calculates and specifies a moving direction of the subject terminal device. The direction specification unit 53 may specify the moving direction of the subject terminal device from the positions of the subject terminal device that are sequentially specified by the position specification unit 51. As an example, the direction in which the approximate line obtained by the least squares method extends from the positions of the subject terminal devices that are arranged in chronological order may be specified as the moving direction of the subject terminal device. The direction specification unit 53 corresponds to the direction specifying unit.

The position of the subject terminal device calculated by the position specification unit 51 corresponds to a vehicle position if the terminal device 10 is used by a vehicle such as an automobile or a bicycle. Further, the position of the subject terminal device calculated by the position specification unit 51 corresponds to a pedestrian position if the terminal device 10 is used by a pedestrian. The moving speed of the subject terminal device calculated by the speed calculation unit 52 corresponds to a vehicle speed if the terminal device 10 is used by a vehicle such as an automobile or a bicycle. Further, the moving speed of the subject terminal device calculated by the speed calculation unit 52 corresponds to a pedestrian speed if the terminal device 10 is used by a pedestrian.

The application processing unit 54 performs processing related to a service using the position of the subject terminal device and the position of the surrounding terminal device calculated by the position specification unit 51. As for the position of the surrounding terminal device, an estimation result by the target determination processing section 571, which will be described later, may be used. The application processing unit 54 may also use the moving speed of the subject terminal device calculated by the speed calculation unit 52. The application processing unit 54 may also use the moving speeds of the surrounding terminal device. As for the speed of the surrounding terminal device, the information of the moving speed contained in the data main part of the communication frame received from the surrounding terminal device may be used. The application processing unit 54 may also use the moving direction of the subject terminal device calculated by the direction specification unit 53. The application processing unit 54 may also use the moving direction of the surrounding terminal device. As for the moving direction of the surrounding terminal device, the information of the moving direction contained in the header part of the communication frame received from the surrounding terminal device may be used. The information of the moving direction included in the header part of the communication frame will be described in detail later.

Examples of the service here include a service that displays the position of a surrounding terminal device relative to the subject terminal device, a service that calls attention to approaching by a moving body that is using the surrounding terminal device to the subject terminal device (i.e., alert), and the like. The service may differ depending on types of the moving bodies that are using the terminal devices 10.

The position of the surrounding terminal device may be displayed by a display device such as a display. When the subject terminal device is used in a vehicle, an in-vehicle display device may perform displaying. When the subject terminal device is used by a bicycle, a pedestrian, or the like, a display device integrally formed with the terminal device 10 may perform displaying. As an example, when the terminal device 10 is used as a part of a high-performance mobile phone, the display of the high-performance mobile phone may perform displaying.

As for the alert, the display device such as a display may display the alert, or the LED or the like may be lit to alert its user. Further, the alert may be done by outputting voice sound from a voice outputting device, or may be done by sounding a buzzer. In addition, the alert may be done by vibrating a vibration element. When the subject terminal device is used in a vehicle, an in-vehicle device may perform the alert. When the subject terminal device is used by a bicycle, a pedestrian, or the like, a device integrally formed with the terminal device 10 may perform the alert. As an example, when the terminal device 10 is used as a part of the high-performance mobile phone, the function of the high-performance mobile phone may perform the alert.

Further, the application processing unit 54 provides the signal transmission processing unit 55 with data to be transmitted from the subject terminal device (hereinafter, transmission data). The transmission data may be, for example, an ID for identifying the subject terminal device, a moving speed of the subject terminal device calculated by the speed calculation unit 52, or the like. When the terminal device 10 is used in a vehicle, the ID for identifying the subject terminal device may be a vehicle ID (Vehicle Identification Number).

As shown in FIG. 3, the signal transmission processing unit 55 includes an encryption processing section 551 and an address calculating section 552 as sub-functional blocks. The encryption processing section 551 encrypts the transmission data provided by the application processing unit 54 via the encrypting/decrypting module 40.

The address calculating section 552 embeds part of the values of the subject position coordinates specified by the position specification unit 51 in the MAC dress and sets part of the values as a transmitting source MAC address. The subject position coordinates may be directly acquired from the position specification unit 51 or indirectly via the application processing unit 54.

The address calculating section 552 uses part of values below a given decimal place (hereinafter, referred to as "low decimal place latitude/longitude coordinates") to set the MAC address as the latitude/longitude coordinates of the subject position. The low decimal place latitude/longitude coordinates are preferably fractional parts of the latitude/longitude coordinates lower than higher place parts above which the values of the latitude/longitude coordinates are estimated to have same values when the subject terminal device is within the communication range of wireless communication by the RF communication module 30. This is because even though the surrounding terminal device within this communication range receives, from the subject terminal device, the low decimal place latitude/longitude coordinates that are only a part of the subject position coordinates, the subject position coordinates can be easily estimated from the higher place parts of the latitude/longitude coordinates of the surrounding terminal device together with the low decimal place latitude/longitude coordinates of the subject vehicle.

As an example, in wireless communication in which radio waves are directly transmitted and received between terminal devices, it is not expected that the communication range will be 10 km or more. Therefore, at least the second decimal place or less of the coordinates of the latitude and longitude may be used as the low decimal place latitude/longitude coordinates. For example, the third decimal place to the sixth decimal place of the coordinates of the latitude and longitude are preferably used as the low decimal place latitude/longitude coordinates. The values of the third decimal place to the sixth decimal place among the coordinates of latitude and longitude can express the position in the unit of about 10 km to 1 m. In the example of this embodiment, since the communication range is 200 m to 400 m, it may be considered sufficient to use, for example, the fourth decimal place to the sixth decimal place as the low decimal place latitude/longitude coordinates. Hereinafter, an example where the four-digit values from the third decimal place to the sixth decimal place of the coordinates of the latitude and longitude are used as the low decimal place latitude/longitude coordinates will be described. In the following, among the low decimal place latitude/longitude coordinates, the low decimal place value of latitude is referred to as a "low decimal place latitude coordinate", and the low decimal place value of longitude is referred to as a "low decimal place longitude coordinate".

On the contrary, the address calculating section 552 uses a relatively higher digit part of a value of the altitude coordinate (hereinafter, a high digit altitude coordinate) for setting the MAC address. The high digit altitude coordinate may be the value of the integer part of the altitude coordinate. This is because the unit of the altitude coordinate is "m", and thus the value of the decimal part is a value of less than 1 m, which is not important for calculating the relative distance between the terminal devices 10 which will be described later.

Here, a specific example is shown in which the address calculating section 552 sets the transmitting source MAC address from part of the values of the subject position coordinates specified by the position specification unit 51.

The address calculating section 552 sets 4 digits from the low decimal place latitude coordinate, 4 digits from the low decimal place longitude coordinate, and 2 digits from the high digit altitude coordinate among the 12-digit identification number of the MAC address.

Here, an example where the latitude coordinate is 35.654433, the longitude coordinate is 139.744777, and the altitude coordinate is 15.2224322 will be described. In this case, the low decimal place latitude coordinate is "4433", the low decimal place longitude coordinate is "4477", and the high digit altitude coordinate is "15". Since the MAC address is represented by a hexadecimal number with 0 to 9 and A to F, "4433" is represented as "0x1151", "4477" is represented as "0x117D", and "15" is represented as "0x0F". Therefore, the MAC address is set as "XX:11:51:11:7D:0F", for example. For XX, it is preferable to set the MAC address from, for example, directional information and type information.

The directional information may be information according to the moving direction of the subject terminal device specified by the direction specification unit 53. For example, the directional information may be information indicating the moving direction of the subject terminal device specified by the direction specification unit 53 using any of 16 divided directions. The 16 divided directions are north "N", north-northeast "NNE", northeast "NE", east-northeast "ENE", east "E", east-southeast "ESE", southeast "SE", south-southeast "SSE", south "S", south-southwest "SSW", southwest "SW", west-southwest "WSW", west "W", west-northeast "WNW", northeast "NW", north-northeast "NNW". As an example, the 16 divided directions are given values of 0 to 15, respectively, as shown in FIG. 4. The address calculating section 552 expresses the moving direction of the subject terminal device specified by the direction specification unit 53 using the value of any of 0 to 15, converts the value into a hexadecimal number with 0 to 9 and A to F, and sets the hexadecimal number as the first digit of the MAC address. The directional information is not necessarily limited to the 16 divided directions and may be divided into other numbers such as 4, 8 and the like. In the following description, the directional information is represented using the 16 divided directions.

The type information may be information according to a type of the moving body using the subject terminal device. The type of moving body may be, for example, "pedestrian", "bicycle", "normal vehicle", "construction vehicle", "emergency vehicle", or the like. The term "normal vehicle" as used herein may be any vehicles other than "construction vehicle" and "emergency vehicle". The type of the moving body that uses the subject terminal device may be made available to the address calculating section 552 by, for example, storing the information in a non-volatile memory of the controller 50 in advance. As an example, each of the above-mentioned types of moving bodies is associated with a value of 0 to 4 as shown in FIG. 5. The address calculating section 552 expresses the type of the moving body, which is using the subject terminal device, using the value of any of 0 to 4, converts the value into a hexadecimal number with 0 to 9 and A to F, and then sets the hexadecimal number as the first digit of the MAC address. The types of the moving bodies are not necessarily limited to the above-mentioned types, and the values associated with the types of the moving bodies may be 5 or more. In the following description, an example where the types of moving bodies are five types of "pedestrian", "bicycle", "normal vehicle", "construction vehicle", and "emergency vehicle" will be described.

As shown in FIG. 3, the RF control unit 56 includes a transmitting section 561, an address managing section 562, and a receiving section 563 as sub-functional blocks. The transmitting section 561 sends a communication frame containing, in the data main part, the transmission data encrypted by the encryption processing section 551 to the RF communication module 30 for transmission. The communication frame transmitted by the transmitting section 561 also includes the transmitting source MAC address in the header part.

The address managing section 562 changes the transmitting source MAC address included in the header part of the communication frame transmitted by the transmitting section 561 to the MAC address set by the address calculating section 552.

The header portion of the communication frame transmitted by the transmitting section 561 is not encrypted by the encryption processing section 551. Therefore, the transmitting section 561 includes the low decimal place latitude/longitude coordinates, which are lower place values of the latitude/longitude coordinates, as a part of the position information of the subject terminal device specified by the position specification unit 51, in a region of the communication frame other than the data main part without encrypting the low decimal place latitude/longitude coordinates, then transmits the communication frame including the low decimal place latitude/longitude coordinates wirelessly. Further, the transmitting section 561 includes the high digit altitude coordinate, which is a high digit value of the altitude coordinate, as a part of the position information of the subject terminal device specified by the position specification unit 51, in a region of the communication frame other than the data main part without encrypting the high digit altitude coordinate, then transmits the communication frame including the high digit altitude coordinate wirelessly. Further, the transmitting section 561 includes the directional information according to the moving direction of the subject terminal device specified by the direction specification unit 53 and/or the type information of the moving body using the subject terminal device in a region of the communication frame other than the data main part without encrypting the directional information and/or the type information, and then transmits the communication frame including the directional information and/or the type information wirelessly.

The receiving section 563 receives the communication frame sent from the RF communication module 30 and provides the communication frame to the signal reception processing unit 57. The communication frame transmitted from the RF communication module 30 is a communication frame transmitted from a surrounding terminal device and is received by the RF communication module 30. The communication frame received by the receiving section 563 includes the header part that is not encrypted by the surrounding terminal device in addition to the data main part encrypted by the surrounding terminal device. This header part includes the transmitting source MAC address of the surrounding terminal device. It is assumed that the transmitting source MAC address has been changed by the address managing section 562 of the surrounding terminal device to the MAC address set by the address calculating section 552 of the surrounding terminal device. That is, the transmitting source MAC address in the header part of the communication frame received by the receiving section 563 includes the directional information, the type information, the low decimal place latitude/longitude coordinates, and the high digit altitude coordinate of the surrounding terminal device without being encrypted. Hereinafter, the communication frame received from the surrounding terminal device is referred to as the communication frame of the surrounding terminal device.

As shown in FIG. 3, the signal reception processing unit 57 includes a target determination processing section 571 and a decryption processing section 572 as sub-functional blocks. The target determination processing section 571 acquires the information included in the transmitting source MAC address of the communication frame of the surrounding terminal device received by the receiving section 563, and determines whether the surrounding terminal device should be a target for the subject terminal device using the acquired information. The decryption processing section 572 decrypts, via the encrypting/decrypting module 40, the data main part of the communication frame of the surrounding terminal device determined by the target determination processing section 571 as a target. The decryption processing section 572 provides the information of the decrypted data main part to the application processing unit 54. On the other hand, the decryption processing section 572 does not decrypt the data main part of the communication frame of the surrounding terminal device determined by the target determination processing section 571 not to be a target.

Figure 6:
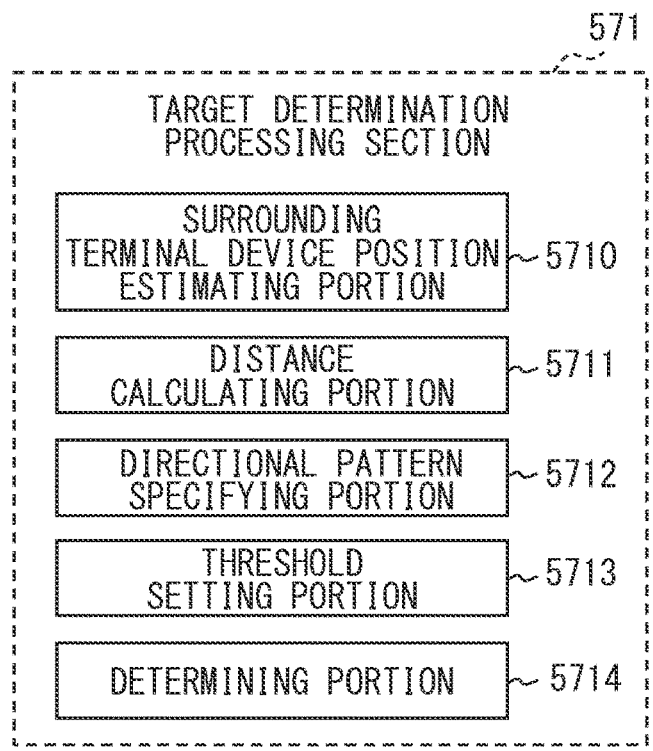
FIG. 6 is a diagram showing an example of a schematic configuration of a target determination processing section.

Here, processing at the target determination processing section 571 will be described in more detail. As shown in FIG. 6, the target determination processing section 571 includes a surrounding terminal device position estimating portion 5710, a distance calculating portion 5711, a directional pattern specifying portion 5712, a threshold setting portion 5713, and a determining portion 5714 as sub-functional blocks.

The surrounding terminal device position estimating portion 5710 estimates coordinates of the latitude and longitude of the position of the surrounding terminal device based on the coordinates of the latitude and longitude of the position of the subject terminal device specified by the position specification unit 51 and the lower decimal place latitude/longitude coordinates of the surrounding terminal device included in the communication frame received by the receiving section 563. As for the lower decimal place latitude/longitude coordinates of the surrounding terminal device received by the receiving section 563, the hexadecimal value may be used by converting it into the decimal number. As an example, the surrounding terminal device position estimating portion 5710 replaces the low decimal place latitude/longitude coordinates of the position of the subject terminal device with the received low decimal place latitude/longitude coordinates of the surrounding terminal device, and uses the replaced values as an estimation of the latitude/longitude coordinates of the surrounding terminal device. In the example of the present embodiment, the low decimal place latitude/longitude coordinates are the values of the third to sixth fractions of the coordinates of the latitude/longitude, so that the surrounding terminal device position estimating portion 5710 estimates the latitude/longitude coordinates of the position of the surrounding terminal device by replacing the values of the third place to the sixth place of the fraction of the latitude/longitude coordinates of the subject terminal device with the low decimal place latitude/longitude coordinates of the surrounding terminal device.

In wireless communication in which radio waves are directly transmitted and received between terminal devices, the higher digit values of the latitude/longitude coordinates of the surrounding terminal device and the subject terminal device, between which the communication frame can be received via wireless communication, are the same as each other. Therefore, even though only the low decimal place latitude/longitude coordinates of the surrounding terminal device are received, the latitude/longitude coordinates of the surrounding terminal device can be estimated from the higher digit values of the latitude/longitude coordinates of the subject terminal device and the low decimal place latitude/longitude coordinates of the surrounding terminal device. For example, in the present embodiment, since the communication range for wireless communication by the RF communication module 30 is 200 m to 400 m, the surrounding terminal device that can receive the communication frame by wireless communication should be located at a distance of less than 400 m from the subject terminal device. Therefore, the surrounding terminal device and the subject terminal device both of which can receive the communication frame by wireless communication have the latitude/longitude coordinates that match each other at least on part thereof from the integer part to the second decimal place. Therefore, the values obtained by replacing the values of the third decimal place to the sixth decimal place of the latitude/longitude coordinates of the subject terminal device with the low decimal place latitude/longitude coordinates of the surrounding terminal device are the same as the coordinates of the latitude and longitude of the surrounding terminal device.

The surrounding terminal device position estimating portion 5710 estimates the altitude of the position of the surrounding terminal device from the high digit altitude coordinate of the surrounding terminal device included in the communication frame received by the receiving section 563. The surrounding terminal device position estimating portion 5710 may estimate the coordinate of altitude of the surrounding terminal device by converting the hexadecimal number of the high digit altitude coordinate of the surrounding terminal device received by the receiving section 563 into a decimal number. That is, the value of the integer part of the altitude coordinate of the surrounding terminal device may be regarded as the coordinate of altitude of the surrounding terminal device. The surrounding terminal device position estimating portion 5710 may estimate the coordinate of altitude of the surrounding terminal device by treating, for example, the first decimal place to the sixth decimal place as 0. However, if the altitude coordinate of the surrounding terminal device up to the sixth decimal place is required for processing at the application processing unit 54, the decimal fractional part of the altitude coordinate of the surrounding terminal device up to the sixth decimal place should be included in the data main part of the communication frame in addition to the high digit altitude coordinate.

The distance calculating portion 5711 calculates a relative distance between the subject terminal device and the surrounding terminal device based on the coordinates of the latitude/longitude/altitude of the subject terminal device specified by the position specification unit 51 and the coordinates of the latitude/longitude/altitude of the surrounding terminal device estimated by the surrounding terminal device position estimating portion 5710. As an example, the linear distance between the point indicated by the coordinates of the latitude/longitude and the rough altitude of the subject terminal device and the point indicated by the coordinates of the latitude/longitude and the rough altitude of the surrounding terminal device is calculated as the relative distance between the subject terminal device and the surrounding terminal device.

Alternatively, the distance calculating portion 5711 may calculate the relative distance between the subject terminal device and the surrounding terminal device without using the altitude coordinate. In this case, the distance calculating portion 5711 calculates a relative distance between the subject terminal device and the surrounding terminal device based on the coordinates of the latitude/longitude of the subject terminal device specified by the position specification unit 51 and the coordinates of the latitude/longitude of the surrounding terminal device estimated by the surrounding terminal device position estimating portion 5710. If the distance calculating portion 5711 calculates the relative distance between the subject terminal device and the surrounding terminal device without using the altitude coordinate, the high digit altitude coordinate may not be set in the transmitting source address.

The directional pattern specifying portion 5712 specifies a combination pattern of moving directions of the subject terminal device specified by the direction specification unit 53 and moving directions of the surrounding terminal device indicated by the directional information of the surrounding terminal device included in the communication frame received by the receiving unit 536 (hereinafter, a directional combination pattern) based on the positional relationship between the latitude/longitude coordinates of the subject terminal device specified by the position specification unit 51 and the latitude/longitude coordinates of the surrounding terminal device estimated by the surrounding terminal device position estimating portion 5710.

Figure 7:
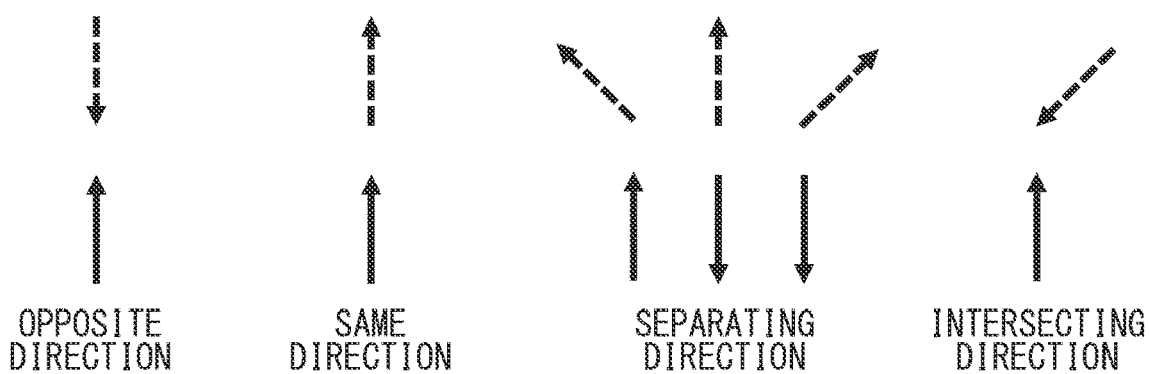
FIG. 7 is a diagram for explaining a directional combination pattern.

Here, the directional combination pattern will be described with reference to FIG. 7. The solid arrows in FIG. 7 indicate the moving directions of the subject terminal device starting from the position of the subject terminal device. The broken lines arrow in FIG. 7 indicate the moving directions of the surrounding terminal device starting from the position of the surrounding terminal device.

For example, the directional combination pattern may be four types of patterns: "opposite direction", "same direction", "separating direction", and "intersecting direction". The "opposite direction" may be a pattern in which the moving directions of the subject terminal device and the surrounding terminal devices are opposite to each other and face each other. The "same direction" may be a pattern in which the moving directions of the subject terminal device and the surrounding terminal devices are the same as each other. The "separating direction" may be a pattern in which the moving directions of the subject terminal device and the surrounding terminal device are in a relationship of separating from each other. For example, this means a pattern in which the moving directions of the subject terminal device and the surrounding terminal devices are opposite to each other but do not face each other. In addition, this also includes a pattern in which the moving directions of the subject terminal device and the surrounding terminal device are neither opposite nor the same and do not intersect each other. The "intersecting direction" may be a pattern in which the moving directions of the subject terminal device and the surrounding terminal device are neither opposite nor the same, but are in a relationship of intersecting each other.

The threshold setting portion 5713 sets a setting threshold value used for determination at the determining portion 5714. The threshold setting portion 5713 sets the setting threshold value according to the directional combination pattern specified by the directional pattern specifying portion 5712 and the type of the surrounding terminal device indicated by the type information included in the communication frame received by the receiving section 563. FIG. 8 shows an example of the setting threshold values according to the directional combination patterns and the types of the surrounding terminal devices.

As for the directional combination pattern, the setting threshold value increases as a likelihood for the pattern that the subject terminal device and the surrounding terminal device will approach each other in future increases. For example, the threshold setting portion 5713 sets the setting threshold value so that the setting threshold value of the "opposite direction" has a maximum value. The setting threshold value for the "intersecting direction" is set to be smaller than the "opposite direction" but equal to or greater than the "same direction". The setting threshold value for the "same direction" is set to be equal to or smaller than the "intersecting direction" and greater than the "separating direction". The setting threshold value for the "separating direction" may be set to 0, for example. As an example, the threshold setting portion 5713 may set the setting threshold values so as to satisfy the relationship of "opposite direction" >"intersecting direction">="same direction">"separating direction".

As for the types of surrounding terminal devices, the setting threshold value for "emergency vehicle" may be set to have a maximum value, and for types other than "emergency vehicle", the setting threshold values increase as the moving speeds increase. This is because the higher the moving speed is, the more the surrounding terminal devices are likely to be a target for the service by the subject terminal device even if the distance from the subject terminal device is large. In other words, the setting threshold value for the type which requires information when located at a point farther away from the subject terminal device is set relatively higher. For example, the threshold setting portion 5713 sets the setting threshold value for the "emergency vehicle" to have a maximum value. For the "construction vehicle" and the "normal vehicle", the setting threshold values are set to be smaller than the "emergency vehicle" but equal to or greater than the "bicycle". For the "construction vehicle" and the "normal vehicle", a same setting threshold value may be set. For the "bicycle", the setting threshold value is set to be smaller than the "construction vehicle" and the "normal vehicle" but greater than the "pedestrian". That is, the threshold setting portion 5713 may set the setting threshold value to satisfy the relationship of "emergency vehicle">"construction vehicle"="normal vehicle">="bicycle">"pedestrian".

The threshold setting portion 5713 may increase the setting threshold value as the moving speed of the subject terminal device specified by the speed calculation unit 52 increases. This is because the higher the moving speed of the subject terminal device is, the more the moving range of the subject terminal device per unit time expands, and therefore a wider target range for information is required.

The determining portion 5714 compares the relative distance between the subject terminal device and the surrounding terminal device calculated by the distance calculating portion 5711 with the setting threshold value set by the threshold setting portion 5713 for the surrounding terminal device. Then, when the relative distance is less than the setting threshold value, the surrounding terminal devices is determined to be a target. On the contrary, when the relative distance is equal to or greater than the setting threshold value, the surrounding terminal device is determined not to be a target.

<Reception-Related Processing in the Controller 50>

Figure 9:
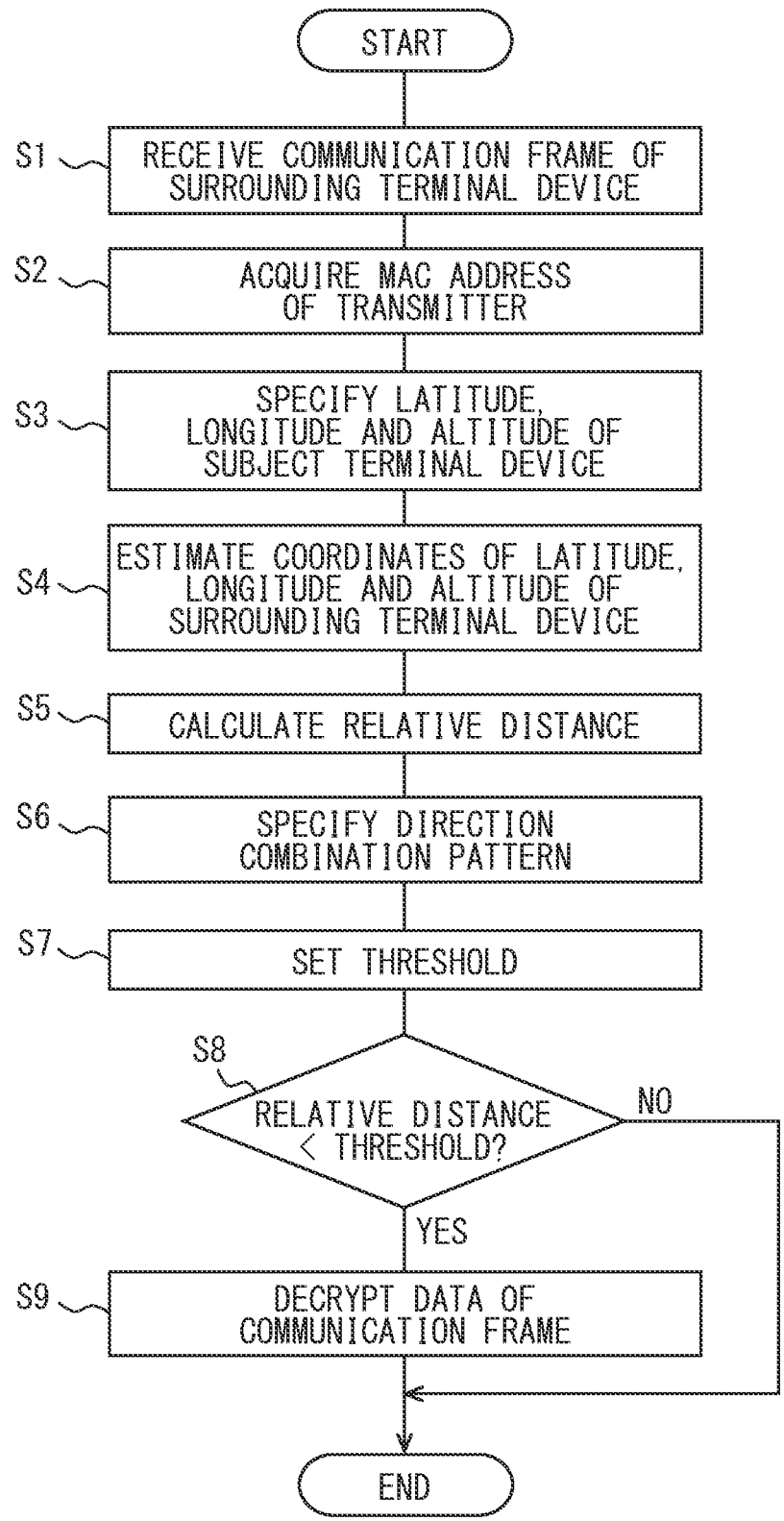
FIG. 9 is a flowchart showing an example of a flow of reception-related processing performed by the controller.

Here, an example of a flow of processing related to receiving a communication frame from a surrounding terminal device at the controller 50 (hereinafter, reception-related processing) will be described with reference to the flowchart illustrated in FIG. 9. The flowchart of FIG. 9 may start when the RF communication module 30 receives a communication frame transmitted from a surrounding terminal device. Executing the steps in the reception-related processing by the computer corresponds to executing the vehicle communication method.

In the beginning, at step S1, the receiving section 563 receives the communication frame of the surrounding terminal device sent from the RF communication module 30 and provides it to the signal receiving processing unit 57. At step S2, the target determination processing section 571 of the signal reception processing unit 57 acquires the transmitting source MAC address in the header part of the communication frame received at S1. At step S3, the position specification unit 51 specifies the coordinates of latitude/longitude/altitude of the subject terminal device. The process of S6 may be executed before the process of S5.

At step S4, the surrounding terminal device position estimating portion 5710 estimates the latitude/longitude/altitude coordinates of the surrounding terminal device from which the communication frame was received at S1. The surrounding terminal device position estimating portion 5710 estimates the coordinates of latitude and longitude of the position of the surrounding terminal device based on the latitude and longitude of the position of the subject terminal device specified at S3 and the low decimal place latitude/longitude coordinates of the surrounding terminal device included in the transmitting source MAC address received at S2. Further, the surrounding terminal device position estimating portion 5710 estimates the coordinates of altitude of the surrounding terminal device from the high digit altitude coordinate of the surrounding terminal device included in the transmitting source MAC address acquired at S2.

At step S5, the distance calculating portion 5711 calculates the relative distance between the subject terminal device and the surrounding terminal device based on the coordinates of the latitude/longitude/altitude of the subject terminal device specified at S3 and the coordinates of the latitude/longitude/altitude of the surrounding terminal device estimated at S4.

At step S6, the directional pattern specifying portion 5712 specifies the directional combination pattern. The directional pattern specifying portion 5712 specifies the directional combination pattern based on the coordinates of the latitude and longitude of the subject terminal device specified at S3, the coordinates of the latitude and longitude of the surrounding terminal devices estimated at S4, and the moving direction of the subject terminal device specified by the directional calculation unit 53, and the moving direction of the surrounding terminal device indicated by the directional information of the surrounding terminal device included in the transmitting source MAC address acquired at S2.

At step S7, the threshold setting portion 5713 sets a setting threshold value used for determination at the determining portion 5714. The threshold setting portion 5713 sets the setting threshold value according to the directional combination pattern specified at S6 and the type of the surrounding terminal device indicated by the type information included in the transmitting source MAC address acquired at S2. The processes of S6 and S7 may be executed before the process of S5.

At step S8, the determining portion 5714 compares the relative distance calculated at S5 with the setting threshold value set at S7. Then, when the relative distance is less than the setting threshold value (YES at S8), the process proceeds to step S9. On the other hand, when the relative distance is equal to or greater than the setting threshold value (NO at S8), the reception-related processing terminates without decrypting the data main part of the communication frame received at S1.

At step S9, the decryption processing section 572 decrypts the data main part of the communication frame received at S1 via the encrypting/decrypting module 40, and terminates the reception-related processing. The decryption processing section 572 provides the information of the decrypted data main part to the application processing unit 54.

Overview of the First Embodiment

According to the first embodiment, although only a part of the value below the decimal point (that is, the low decimal place latitude/longitude coordinates) of the latitude/longitude coordinates of the surrounding terminal device is received from the surrounding terminal device, the entire latitude/longitude coordinates of the surrounding terminal device can be estimated based on the latitude/longitude coordinates of the subject terminal device and the received low decimal place latitude/longitude coordinates of the surrounding terminal device. Further, since the low decimal place latitude/longitude coordinates are included in the header part of the communication frame without being encrypted, the entire coordinates of the surrounding terminal devices can be estimated without decrypting the data main part. Therefore, it is possible to decrypt the data main part only when the surrounding terminal device is determined that the data main part needs to be descripted from the coordinates of the surrounding terminal device. Therefore, it is possible to reduce unnecessary decryption of the data main part for the surrounding terminal device for which decryption is not required. As a result, it is possible to reduce processing load when the subject vehicle performs a service using the information transmitted from the surrounding terminal device around the subject vehicle via wireless communication.

Further, according to the first embodiment, transmission from the terminal device 10 without encryption is done only for lower decimal place part of the coordinates of the latitude and longitude measured by the terminal device 10. This does not mean that the entire coordinates of the latitude and longitude from the integer part to the fractional part is sent without encryption. Therefore, even when there is an obligation not to transmit the entire value of the coordinates of the latitude and longitude from the integer part to the fractional part of the coordinates of the latitude and longitude measured by the terminal device 10 without encryption, this obligation is not violated.

Further, according to the first embodiment, the setting threshold value used for determining at the determining portion 5714 is set according to the directional combination pattern specified by the directional pattern specifying portion 5712. Therefore, for a pattern which is estimated to have a high possibility that the subject terminal device and the surrounding terminal device will approach to each other in future, the setting threshold value has a relatively higher value, which enables the information of the surrounding terminal device having a high possibility that the subject terminal device and the surrounding terminal device will approach to each other to be utilized for the service by the subject terminal device.

In addition, according to the first embodiment, the setting threshold value used for determination at the determining portion 5714 is also set according to the type of the surrounding terminal device indicated by the type information included in the communication frame received by the receiving section 563. Therefore, for the type of a surrounding terminal device that is estimated to require information when located at a farther position from the subject terminal device, the setting threshold value is set to have a relatively higher value. As a result, the information of the surrounding terminal device that is estimated to require information when located at a farther position can be utilized for a service provided by the subject terminal device when the subject terminal device is located far away from the subject terminal device.

Second Embodiment

In the first embodiment, the type information is included in the transmitting source MAC address, but the present invention is not necessarily limited to this embodiment. For example, the type information may be included in a header part other than the MAC address.

Third Embodiment

In the first embodiment, the threshold setting portion 5713 sets the setting threshold value used for determination at the determining portion 5714 according to the directional combination pattern specified by the directional pattern specifying portion 5712 and the type of the surrounding terminal device indicated by the type information included in the communication frame received by the receiving section 563.

However, according to a third embodiment, the threshold setting portion 5713 sets the threshold value according to the directional combination pattern specified by the directional pattern specifying portion 5712 without using the type of the surrounding terminal device indicated by the type information included in the communication frame received by the receiving section 563. In the third embodiment, the address calculating section 552 may not set the MAC address from the type information. FIG. 10 shows an example of the setting threshold values according to the directional combination pattern in the third embodiment. As shown in FIG. 10, the setting threshold value is relatively high for the directional combination pattern with a higher likelihood of approaching.

Fourth Embodiment

According to a fourth embodiment, the threshold setting portion 5713 sets the threshold value according to the type of the surrounding terminal device indicated by the type information included in the communication frame received by the receiving section 563 without using the directional combination pattern specified by the directional pattern specifying portion 5712. In the fourth embodiment, the directional pattern specifying portion 5712 may be eliminated, or the address calculating section 552 may not set the MAC address from the directional combination pattern. FIG. 11 shows an example of the setting threshold values according to the type of the surrounding terminal device in the fourth embodiment. As shown in FIG. 11, the setting threshold value for "emergency vehicle" may be set to have a highest value, and for types other than "emergency vehicle", the setting threshold values increase as the moving speed increases.

Fifth Embodiment

Further, according to a fifth embodiment, the threshold setting portion 5713 sets the threshold value without using the directional combination pattern specified by the directional pattern specifying portion 5712 and the type of the surrounding terminal device indicated by the type information included in the communication frame received by the receiving section 563. In this case, the set threshold value may be a fixed value. Furthermore, the threshold setting portion 5713 may increase the setting threshold value as the moving speed of the subject terminal device specified by the speed calculation unit 52 increases. In the fifth embodiment, the address calculating section 552 may not set the MAC address from the directional combination pattern and the type information. Further, the directional pattern specifying portion 5712 may be eliminated.

Sixth Embodiment

In the first embodiment, the controller 50 includes the target determination processing section 571, but the present disclosure is not necessarily limited to this. For example, the target determination processing section 571 may be provided in the RF communication module 30. Since the processing in the target determination processing section 571 can be executed even if the data main part of the communication frame received from the surrounding terminal device is not encrypted, the target determination processing section 571 can be disposed in the RF communication module 30. Further, by adopting this configuration, it is possible to reduce the processing load on the controller 50.

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure. In addition, the control unit and the method described in the present disclosure may be implemented by a dedicated computer that configures a processor programmed to execute one or a plurality of functions embodied by a computer program. Alternatively, the apparatus and techniques described in this disclosure may be implemented by dedicated hardware logic. Alternatively, the control unit and the control method described in the present disclosure may be implemented by one or more special purpose computers configured by a combination of a processor executing a computer program and one or more hardware logic circuits. The computer program may be stored, as instructions to be executed by a computer, in a tangible non-transitory computer-readable medium.

The invention claimed is:

1. A vehicle communication device for a subject vehicle configured to wirelessly receive a communication frame having a data main part that is encrypted, the device comprising:
    a position specification unit that is configured to specify at least coordinates of latitude and longitude of a position of a subject vehicle as position information;
    a receiving unit that is configured to receive the communication frame transmitted from a surrounding terminal device around the subject vehicle, the communication frame including, in a region other than the data main part, low decimal place latitude/longitude coordinates that are low decimal place part of coordinates of latitude and longitude of a position of the surrounding terminal device and that are not encrypted; and
    a surrounding terminal device position estimating unit that is configured to estimate coordinates of latitude and longitude of the position of the surrounding terminal device based on the coordinates of latitude and longitude of the subject vehicle specified by the position specification unit and the low decimal place latitude/longitude coordinates of the surrounding terminal device included in the communication frame received by the receiving unit, wherein the surrounding terminal device for which data decryption is required is selected based on the estimated coordinates of latitude and longitude of the position of the subject vehicle.

2. The vehicle communication device according to claim 1, wherein the communication frame includes a physical address of the surrounding terminal device in a region other than the data main part of the communication frame, the physical address is variable, and the low decimal place latitude/longitude coordinates are used as the physical address.

3. The vehicle communication device according to claim 1, wherein the low decimal place latitude/longitude coordinates are fractional parts of the latitude/longitude coordinates of the surrounding terminal device that are lower than higher place part of the latitude/longitude coordinates of the surrounding terminal device that are estimated to have same values when the surrounding terminal device is located within a wireless communication range between the subject vehicle and the surrounding terminal device.

4. The vehicle communication device according to claim 1, further comprising:

a distance calculation unit that is configured to calculate a relative distance between the subject vehicle and the surrounding terminal device based on the coordinates of latitude and longitude of the subject vehicle specified by the position specification unit and the coordinates of latitude and longitude of the surrounding terminal device estimated by the surrounding terminal device position estimating unit; and a decryption processing unit that is configured to decrypt the encrypted data main part of the communication frame received by the receiving unit, wherein the decryption processing unit is configured to:
  decrypt the data main part when the relative distance calculated by the distance calculation unit is less than a setting threshold value; and
  not decrypt the data main part when the relative distance is equal to or greater than the setting threshold value.

5. The vehicle communication device according to claim 4, further comprising:

a direction specification unit that is configured to specify a moving direction of the subject vehicle; and a threshold setting unit that is configured to set the setting threshold value, wherein the receiving unit is configured to receive the communication frame that is transmitted from the surrounding terminal device and includes a moving direction of the surrounding terminal device in addition to the low decimal place latitude/longitude coordinates of the surrounding terminal device, the moving direction is included in a region of the communication frame other than the data main part and is not encrypted, and the threshold setting unit is configured to set the setting threshold value according to a combination pattern of moving directions of the subject vehicle specified by the direction specification unit and moving directions of the surrounding terminal device included in the communication frame received by the receiving unit based on a positional relationship between the coordinates of latitude and longitude of the subject vehicle specified by the position specification unit and the coordinates of latitude and longitude of the surrounding terminal device estimated by the surrounding terminal device position estimation unit.

6. The vehicle communication device according to claim 4, further comprising:

a threshold setting unit that is configured to set the setting threshold value, wherein the receiving unit is configured to receive the communication frame that is transmitted from the surrounding terminal device and includes a type of the surrounding terminal device in addition to the low decimal place latitude/longitude coordinates of the surrounding terminal device, the type of the surrounding terminal device is included in a region of the communication frame other than the data main part and is not encrypted, and the threshold setting unit is configured to set the setting threshold value according to the type of the surrounding terminal device included in the communication frame received by the receiving unit.

7. The vehicle communication device according to claim 4, wherein the position specification unit is further configured to specify a coordinate of altitude of the position of the subject vehicle as the position information, the receiving unit is configured to receive the communication frame that is transmitted from the surrounding terminal device and includes a high digit altitude coordinate of the position of the surrounding terminal device in addition to the low decimal place latitude/longitude coordinates of the surrounding terminal device, the high digit altitude coordinate is high digit part of the coordinate of altitude of the surrounding terminal device, is included in a region of the communication frame other than the data main part, and is not encrypted, and the distance calculation unit is configured to calculate the relative distance using the coordinates of latitude and longitude of the subject vehicle and the coordinate of altitude of the subject vehicle specified by the position specification unit, the coordinates of latitude and longitude of the surrounding terminal device estimated by the surrounding terminal device position estimating unit, and the high digit altitude coordinate of the surrounding terminal device received by the receiving unit.

8. The vehicle communication device according to claim 1, wherein the position specification unit is further configured to specify a coordinate of altitude of the position of the subject vehicle as the position information, the receiving unit is configured to receive the communication frame that is transmitted from the surrounding terminal device and includes a high digit altitude coordinate of the position of the surrounding terminal device in addition to the low decimal place latitude/longitude coordinates of the surrounding terminal device, and the high digit altitude coordinate is high digit part of the coordinate of altitude of the surrounding terminal device, is included in a region of the communication frame other than the data main part, and is not encrypted.

9. A vehicle communication method performed at a subject vehicle that is configured to wirelessly receive a communication frame having a data main part that is encrypted, the method comprising:
specifying coordinates of latitude and longitude of a position of the subject vehicle as position information;
receiving the communication frame transmitted from a surrounding terminal device around the subject vehicle, the communication frame including, in a region other than the data main part, low decimal place latitude/longitude coordinates that are low decimal place part of coordinates of latitude and longitude of a position of the surrounding terminal device and that are not encrypted; and
estimating coordinates of latitude and longitude of the position of the surrounding terminal device based on the specified coordinates of latitude and longitude of the subject vehicle and the low decimal place latitude/longitude coordinates of the surrounding terminal device included in the received communication frame, wherein
the surrounding terminal device for which data decryption is required is selected based on the estimated coordinates of latitude and longitude of the position of the subject vehicle.

10. A vehicle communication device for a subject vehicle configured to wirelessly receive a communication frame having a data main part that is encrypted, the device comprising:
at least one processor programmed to:
specify at least coordinates of latitude and longitude of a position of a subject vehicle as position information;
receive the communication frame transmitted from a surrounding terminal device around the subject vehicle, the communication frame including, in a region other than the data main part, low decimal place latitude/longitude coordinates that are low decimal place part of coordinates of latitude and longitude of a position of the surrounding terminal device and that are not encrypted; and
estimate coordinates of latitude and longitude of the position of the surrounding terminal device based on the specified coordinates of latitude and longitude of the subject vehicle and the low decimal place latitude/longitude coordinates of the surrounding terminal device included in the received communication frame, wherein
the surrounding terminal device for which data decryption is required is selected based on the estimated coordinates of latitude and longitude of the position of the subject vehicle.

* * * * *